United States Patent
Field et al.

(10) Patent No.: US 12,204,553 B2
(45) Date of Patent: *Jan. 21, 2025

(54) PROCESSING FUNCTIONALITY TO STORE SPARSE FEATURE SETS

(71) Applicant: Snowflake Inc., Bozeman, MT (US)

(72) Inventors: Simon A. Field, Aylesbury (GB); Stuart Ozer, Oakland, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/458,425

(22) Filed: Aug. 30, 2023

(65) Prior Publication Data

US 2023/0409589 A1 Dec. 21, 2023

Related U.S. Application Data

(63) Continuation of application No. 18/162,522, filed on Jan. 31, 2023, now Pat. No. 11,775,544, which is a continuation of application No. 17/899,160, filed on Aug. 30, 2022, now Pat. No. 11,609,927, which is a
(Continued)

(51) Int. Cl.
*G06F 16/22* (2019.01)
*G06F 16/2455* (2019.01)
*G06F 16/25* (2019.01)
*G06F 16/84* (2019.01)

(52) U.S. Cl.
CPC .......... *G06F 16/25* (2019.01); *G06F 16/2282* (2019.01); *G06F 16/24558* (2019.01); *G06F 16/86* (2019.01)

(58) Field of Classification Search
None
See application file for complete search history.

(56) References Cited

U.S. PATENT DOCUMENTS

| 6,298,342 B1 | 10/2001 | Graefe et al. |
| 9,031,901 B1 | 5/2015 | King et al. |
| 10,642,856 B1 | 5/2020 | Chu et al. |

(Continued)

OTHER PUBLICATIONS

"U.S. Appl. No. 17/390,883, Non Final Office Action mailed Nov. 23, 2021", 18 pgs.

(Continued)

*Primary Examiner* — Scott A. Waldron
(74) *Attorney, Agent, or Firm* — Schwegman Lundberg & Woessner, P.A.

(57) ABSTRACT

The subject technology generates, by a database system, cell data for a particular table based on values from a source table, the values being based on raw input data, the source table comprising multiple rows and multiple columns, the raw input data comprising values in a first format, the values comprising input features corresponding to datasets included in the raw input data for machine learning models, the source table being provided by an external environment, the external environment comprising an external system from the database system. The subject technology performs a database operation to generate the particular table including table metadata, column metadata, and the generated cell data, the generated particular table comprising a second format that causes more efficient processing of data by the database system using a single query on the particular table compared to processing the raw input data from the source table.

20 Claims, 8 Drawing Sheets

Related U.S. Application Data continuation of application No. 17/390,883, filed on Jul. 31, 2021, now Pat. No. 11,461,351.

(60) Provisional application No. 63/202,192, filed on May 31, 2021.

(56) References Cited

U.S. PATENT DOCUMENTS

| | | | |
|---|---|---|---|
| 11,461,351 | B1 | 10/2022 | Field et al. |
| 11,609,927 | B2 | 3/2023 | Field et al. |
| 11,775,544 | B2 | 10/2023 | Field et al. |
| 2020/0034481 | A1 | 1/2020 | Asplund et al. |
| 2023/0004571 | A1 | 1/2023 | Field et al. |
| 2023/0177063 | A1 | 6/2023 | Field et al. |

OTHER PUBLICATIONS

"Fast, Efficient Processing of Semi-Structured Data", Snowflake Computing, Inc., Whitepaper WP_SEMI_1_0_062015, 5 pgs.

"U.S. Appl. No. 17/390,883, Response filed Feb. 22, 2022 to Non Final Office Action mailed Nov. 23, 2021", 13 pgs.

"U.S. Appl. No. 17/390,883, Final Office Action mailed Mar. 7, 2022", 24 pgs.

"Modern Reference Architectures for Application Builders", Snowflake, blog post dated Feb. 25, 2020, [Online] Retrieved from the internet:https: www.snowflake.com blog modern-reference-architectures-for-application-builders, (2020), 4 pgs.

"7 Snowflake Reference Architectures for Application Builders", Snowflake, Snowflake E-Book, (2020), 13 pgs.

"U.S. Appl. No. 17/390,883, Response filed Jun. 7, 2022 to Final Office Action mailed Mar. 7, 2022", 13 pgs.

"U.S. Appl. No. 17/390,883, Notice of Allowance mailed Jun. 23, 2022", 13 pgs.

"U.S. Appl. No. 17/899,160, Notice of Allowance mailed Nov. 23, 2022", 10 pgs.

"U.S. Appl. No. 18/162,522, Non Final Office Action mailed Apr. 21, 2023", 13 pgs.

"U.S. Appl. No. 18/162,522, Response filed May 31, 2023 to Non Final Office Action mailed Apr. 21, 2023", 10 pgs.

"U.S. Appl. No. 18/162,522, Notice of Allowance mailed Jun. 16, 2023", 7 pgs.

Dageville, Benoit, "The Snowflake Elastic Data Warehouse", Proceedings of the 2017 ACM on Conference on Information and Knowledge Management, CIKM '17, New York, NY, (Jun. 14, 2016), 215-226.

Motivala, Ashish, "The Snowflake Elastic Data Warehouse SIGMOD 2016 and Beyond", slideshow presentation at Carnegie Mellon University, Available at:https: 15721 .courses.cs.cmu.edu spring2018 slides 25-snowflake.pdf, (May 2, 2018), 40 pgs.

Wheeler, Jared Thomas, "Extracting a Relational Database Schema from a Document Database", [online]. UNF Graduate Theses and Dissertations. 730, Retrieved from the Internet: URL: https: digitalcommons.unf.edu etd 730, (2017), 146 pgs.

FIG. 6

EXAMPLE: MTCARS DATA — 610

| MPG | CYL | DISP | HP | DRAT | WT | QSEC | VS | CM | GEAR | CARB | CARS |
|---|---|---|---|---|---|---|---|---|---|---|---|
| <DBL> | <DBL> | <DBL> | <DBL> | <DBL> | <DBL> | <DBL> | <DBL> | <DBL> | <DBL> | <DBL> | <CHR> |
| 21 | 6 | 160 | 110 | 3.9 | 2.62 | 16.5 | 0 | 1 | 4 | 4 | MAZDA RX4 |
| 21 | 6 | 160 | 110 | 3.9 | 2.88 | 17.0 | 0 | 1 | 4 | 4 | MAZDA RX4 WAG |
| 22.8 | 4 | 108 | 96 | 3.85 | 2.32 | 18.6 | 1 | 1 | 4 | 1 | DATSUN 710 |
| 21.4 | 6 | 258 | 110 | 3.08 | 3.22 | 19.4 | 1 | 0 | 3 | 1 | HORNET 4 DRIVE |
| 18.7 | 8 | 360 | 175 | 3.15 | 3.44 | 17.0 | 0 | 0 | 3 | 2 | HORNET SPORTABOUT |
| 18.1 | 6 | 225 | 105 | 2.76 | 3.46 | 20.2 | 1 | 0 | 3 | 1 | VALIANT |
| 14.3 | 8 | 360 | 245 | 3.21 | 3.57 | 15.8 | 0 | 0 | 3 | 4 | DUSTER 360 |
| 24.4 | 4 | 147. | 62 | 3.69 | 3.19 | 20 | 1 | 0 | 4 | 2 | MERC 240D |
| 22.8 | 4 | 141. | 95 | 3.92 | 3.15 | 22.9 | 1 | 0 | 4 | 2 | MERC 230 |
| 19.2 | 6 | 168. | 123 | 3.92 | 3.44 | 18.3 | 1 | 0 | 4 | 4 | MERC 280 |

'UNPIVOT'
OBJECT_CONSTRUCT(*) → LATERAL FLATTEN

620

| ROW_TYPE | ROW_QIDPS_DATA::VARIANT |
|---|---|
| TABLE METADATA | 3,"CID":1,"KEY":"TAB_METADATA","MTS":"2020-11-26 03:20:56.543 -0800","OID":3,"RID":1,"TID":2,"VALUE":"PRIMARY_KEYS":["CA |
| COLUMN METADATA | 2,"CID":2,"KEY":"CARS","MTS":"2020-11-26 03:20:56.543 -0800","OID":2,"RID":1,"TID":2,"VALUE":{"COLUMN_NAME":"ID" |
| COLUMN METADATA | 2,"CID":3,"KEY":"CARS","MTS":"2020-11-26 03:20:56.543 -0800","OID":2,"RID":1,"TID":2,"VALUE":{"CHARACTER_MAXIMUM_L |
| COLUMN METADATA | 2,"CID":4,"KEY":"DISP","MTS":"2020-11-26 03:20:56.543 -0800","OID":2,"RID":1,"TID":2,"VALUE":{"COLUMN_NAME":"DISP" |
| COLUMN METADATA | 2,"CID":5,"KEY":"HP","MTS":"2020-11-26 03:20:56.543 -0800","OID":2,"RID":1,"TID":2,"VALUE":{"COLUMN_NAME":"WP","D |
| COLUMN METADATA | 2,"CID":6,"KEY":"DRAT","MTS":"2020-11-26 03:20:56.543 -0800","OID":2,"RID":1,"TID":2,"VALUE":{"COLUMN_NAME":"DRAT" |
| COLUMN METADATA | 2,"CID":7,"KEY":"WT","MTS":"2020-11-26 03:20:56.543 -0800","OID":2,"RID":1,"TID":2,"VALUE":{"COLUMN_NAME":"QSEC" |
| COLUMN METADATA | 2,"CID":8,"KEY":"QSEC","MTS":"2020-11-26 03:20:56.543 -0800","OID":2,"RID":1,"TID":2,"VALUE":{"COLUMN_NAME":"VS","D |
| COLUMN METADATA | 2,"CID":9,"KEY":"VS","MTS":"2020-11-26 03:20:56.543 -0800","OID":2,"RID":1,"TID":2,"VALUE":{"COLUMN_NAME":"AM","D |
| COLUMN METADATA | 2,"CID":10,"KEY":"CM","MTS":"2020-11-26 03:20:56.543 -0800","OID":2,"RID":1,"TID":2,"VALUE":{"COLUMN_NAME":"GEAR" |
| COLUMN METADATA | 2,"CID":11,"KEY":"GEAR","MTS":"2020-11-26 03:20:56.543 -0800","OID":2,"RID":1,"TID":2,"VALUE":{"COLUMN_NAME":"CARE" |
| COLUMN METADATA | 2,"CID":12,"KEY":"CARB","MTS":"2020-11-26 03:20:56.543 -0800","OID":2,"RID":1,"TID":2,"VALUE":{"COLUMN_NAME":"CYL" |
| COLUMN METADATA | 2,"CID":13,"KEY":"CARS","MTS":"2020-11-26 03:20:56.543 -0800","OID":2,"RID":1,"TID":2,"VALUE":{"CHARACTER_MAXIMUM_H |
| COLUMN METADATA | 2,"CID":14,"KEY":"AM","MTS":"2020-11-26 03:20:56.543 -0800","OID":2,"RID":1,"TID":2,"VALUE":{"CHARACTER_MAXIMUM_H |
| CELL DATA | 2,"CID":1,"KEY":"ID","MTS":"2020-11-26 03:21:20.042 -0800","OID":1,"RID":1,"TID":2,"VALUE":"10} |
| CELL DATA | 1,"CID":2,"KEY":"CARS","MTS":"2020-11-26 03:21:20.042 -0800","OID":1,"RID":1,"TID":2,"VALUE":"CAMARO 228"} |
| CELL DATA | 1,"CID":3,"KEY":"DISP","MTS":"2020-11-26 03:21:20.042 -0800","OID":1,"RID":1,"TID":2,"VALUE":1.330000000000000E+01} |
| CELL DATA | 1,"CID":4,"KEY":"HP","MTS":"2020-11-26 03:21:20.042 -0800","OID":1,"RID":1,"TID":2,"VALUE":2.450000000000000E+02} |
| CELL DATA | 1,"CID":5,"KEY":"DRAT","MTS":"2020-11-26 03:21:20.042 -0800","OID":1,"RID":1,"TID":2,"VALUE":3.730000000000000E+00} |
| CELL DATA | 1,"CID":6,"KEY":"WT","MTS":"2020-11-26 03:21:20.042 -0800","OID":1,"RID":1,"TID":2,"VALUE":3.340000000000000E+00} |
| CELL DATA | 1,"CID":7,"KEY":"QSEC","MTS":"2020-11-26 03:21:20.042 -0800","OID":1,"RID":1,"TID":2,"VALUE":1.541000000000000E+01} |
| CELL DATA | 1,"CID":8,"KEY":"VS","MTS":"2020-11-26 03:21:20.042 -0800","OID":1,"RID":1,"TID":2,"VALUE":0.000000000000000E+00} |
| CELL DATA | 1,"CID":9,"KEY":"AM","MTS":"2020-11-26 03:21:20.042 -0800","OID":1,"RID":1,"TID":2,"VALUE":0.000000000000000E+00} |

PROCESSING FUNCTIONALITY TO STORE SPARSE FEATURE SETS

CROSS-REFERENCE TO RELATED APPLICATIONS

This application is a continuation of U.S. patent application Ser. No. 18/162,522, filed Jan. 31, 2023, entitled "FEATURE SETS USING SEMI-STRUCTURED DATA STORAGE," which is a continuation of U.S. patent application Ser. No. 17/899,160, filed Aug. 30, 2022, entitled "STORING FEATURE SETS USING SEMI-STRUCTURED DATA STORAGE," now issued as U.S. Pat. No. 11,609,927, which is a continuation of U.S. patent application Ser. No. 17/390,883, filed Jul. 31, 2021, entitled "SEMI-STRUCTURED DATA STORAGE AND PROCESSING FUNCTIONALITY TO STORE SPARSE FEATURE SETS," now issued as U.S. Pat. No. 11,461,351, which claims priority to U.S. Provisional Patent Application Ser. No. 63/202,192, filed May 31, 2021, entitled "SEMI-STRUCTURED DATA STORAGE AND PROCESSING FUNCTIONALITY TO STORE SPARSE FEATURE SETS," and the contents of each of which are incorporated herein by reference in their entireties for all purposes.

TECHNICAL FIELD

Embodiments of the disclosure relate generally to a network-based database system or a cloud data platform and, more specifically, to processing and storing data for machine learning models within the database system.

BACKGROUND

Cloud-based data warehouses and other database systems or data platforms are often utilized for developing machine learning models and applications that leverage such models. However, such systems may have difficulty in processing datasets for machine learning due to inherent structures or formats for storing such datasets which can reduce computational efficiency and increase storage utilization.

BRIEF DESCRIPTION OF THE DRAWINGS

The present disclosure will be understood more fully from the detailed description given below and from the accompanying drawings of various embodiments of the disclosure.

FIG. 6 illustrates examples of database tables, in accordance with some embodiments of the present disclosure.

DETAILED DESCRIPTION

Figure 1:
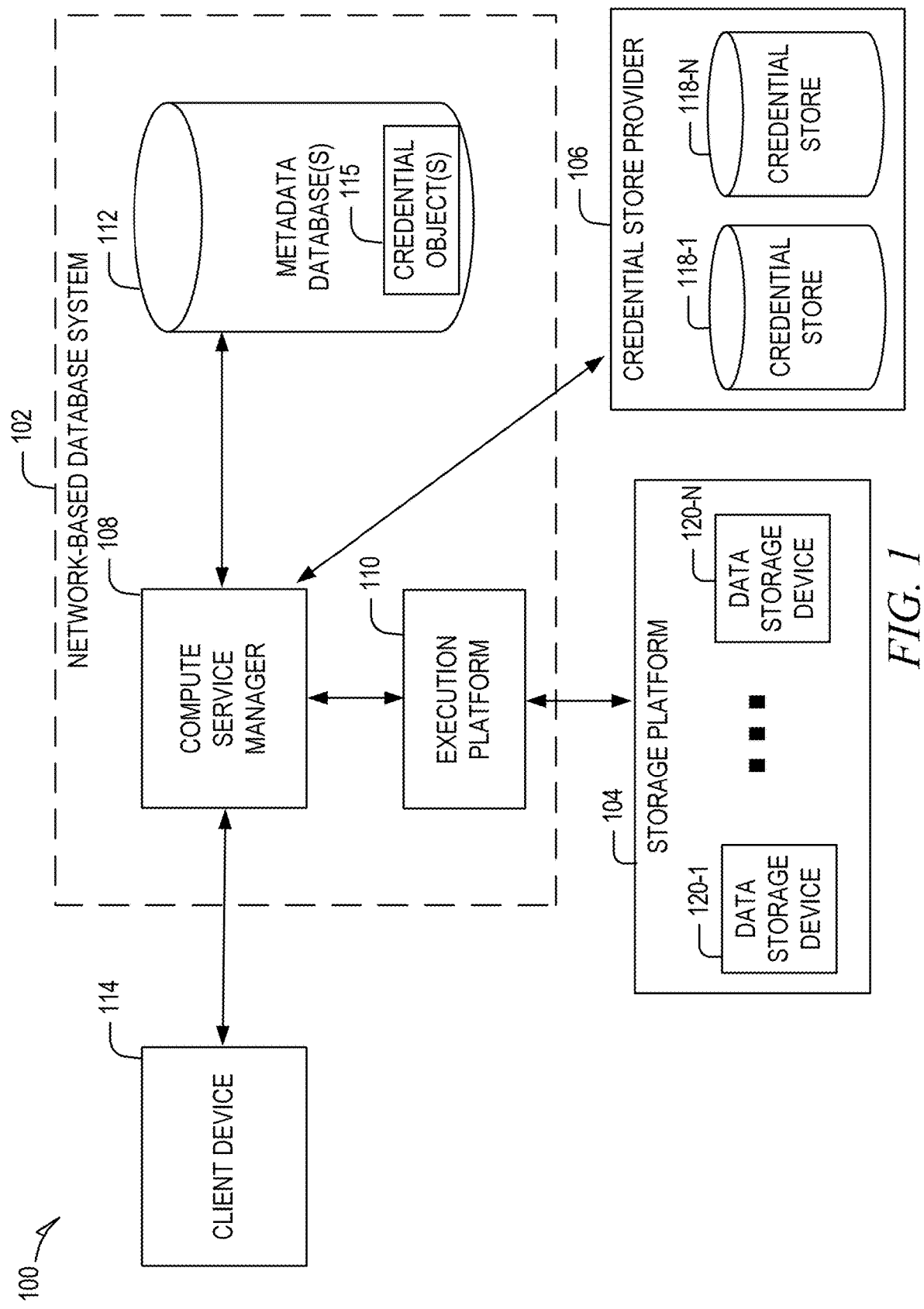
FIG. 1 illustrates an example computing environment that includes a network-based data warehouse system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Machine learning (ML) has seen a rise in popularity in recent years due to the availability of massive amounts of raw input data, and advances in more powerful and efficient computing hardware. Machine learning may utilize models that are executed to provide predictions in particular applications.

A machine learning lifecycle may include the following distinct stages: data collection, annotation, exploration, feature engineering, experimentation, training, evaluation, and deployment. The machine learning lifecycle can be iterative from data collection through evaluation. At each stage, any prior stage could be revisited, and each stage can also change the size and shape of the data used to generate the ML model.

A machine learning development lifecycle may be highly-iterative and experimental. For example, experiments involving tens or hundreds of input features and model parameters may be required to produce an accurate and well-calibrated ML model. In an example, a team of users (e.g., developers) conduct experiments and tests with many data inputs, often in both local and distributed (e.g., networked) computing environments such as a machine learning development environment.

In some examples, data and physical sciences or technology areas often generate datasets for storage and analysis that are "tall" (e.g., based on a number of multiple rows/observations), and also very wide (based on a number of multiple columns/features). Examples of such datasets include applications for genome base-pairs, recommendation-systems (customer×purchase matrix), fraud detection, classification, and the like. Such datasets therefore can present challenges for storage and processing in conventional relational database systems. In particular, very wide datasets can go beyond physical table processing and storage limits of such relational database tables as supported in such relaxational database systems. In an example, these issues may be solved utilizing file-stores and clustered high-performance computing environments using various forms of sparse-matrix representations. Moreover, such challenges, and the limitations of conventional relational-database systems have also popularized the data-lake (e.g., file-store) for data/physical science processing.

As described further herein, the subject technology provides techniques (e.g., sparse-matrix/key-value) to model the data values as "cells" making extensive use of semi-structured data processing and storage features to store the data-values, and their metadata (e.g., table, column, row level) in a single table using single variant (semi-structured) column for maximum application flexibility. Advantageously, in some implementations, embodiments of the subject technology provide considerable flexibility to implement standard pattern based approaches for selective data-retrieval, sparse (e.g., null/zero) value imputation, common transformations, and sparse-matrix computation methods via SQL and UDFs (e.g., user defined functions) inside the database, without the need for data extraction or external data-processing.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
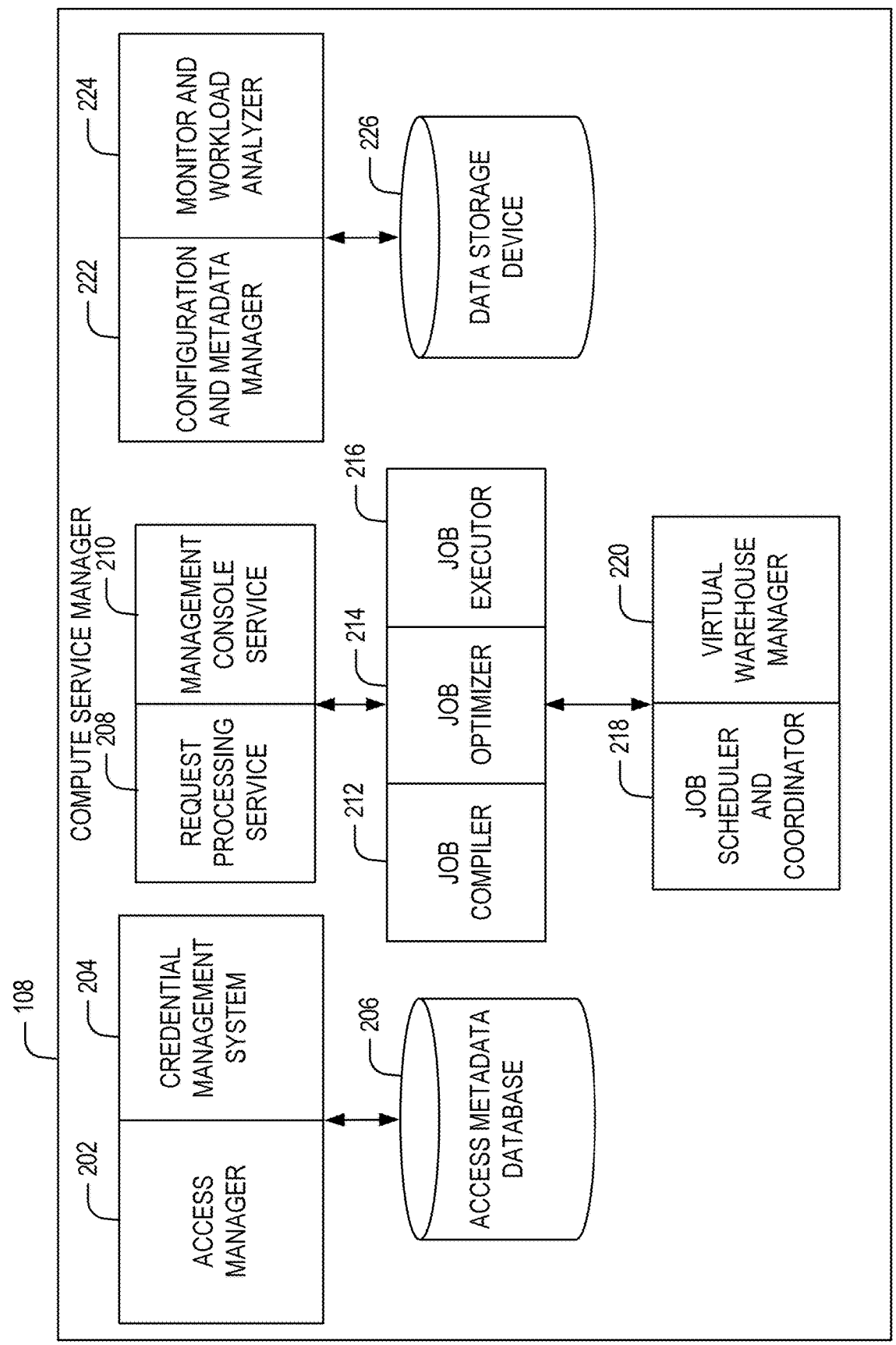
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
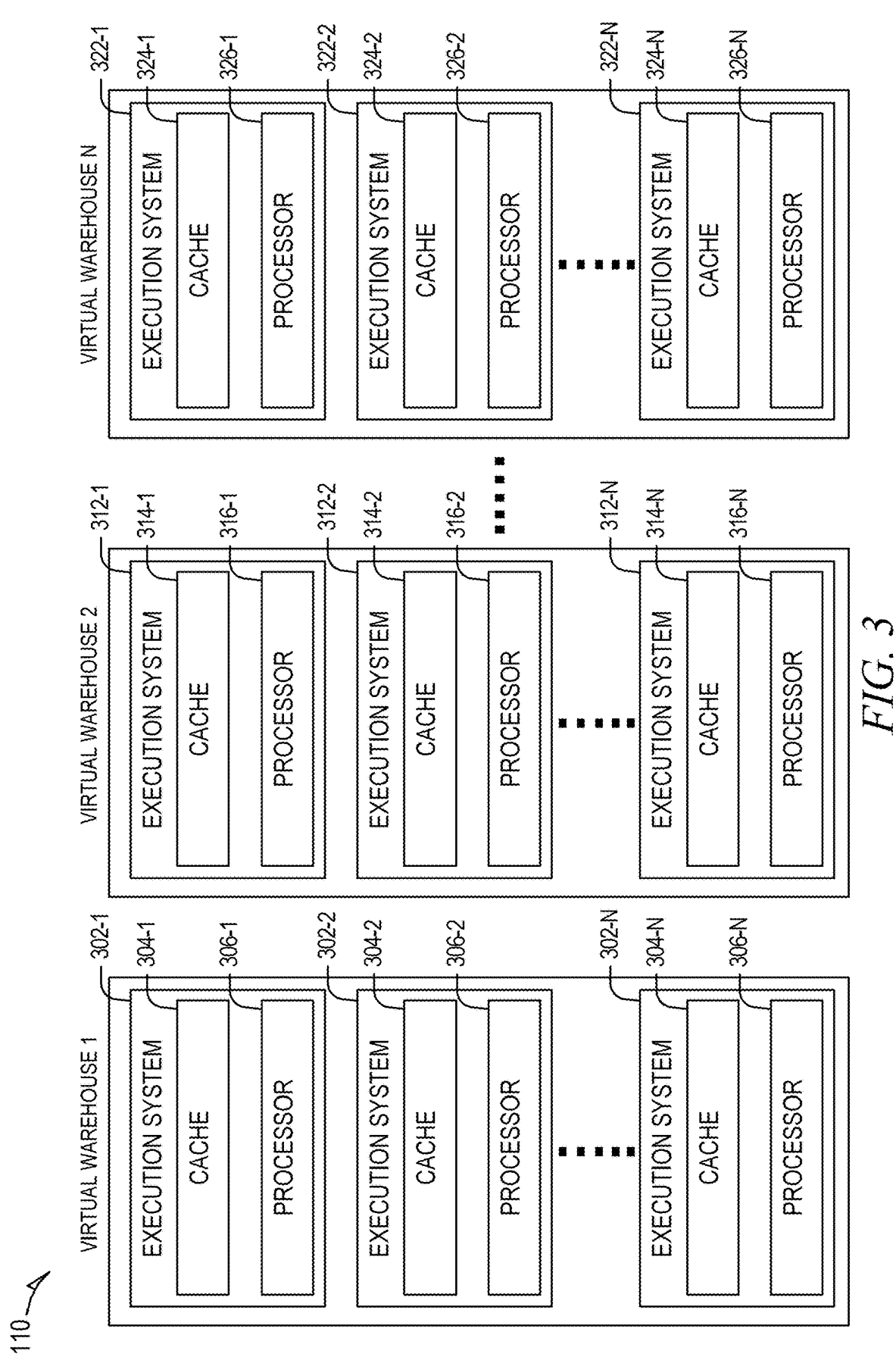
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-*n*. Execution node 302-1 includes a cache 304-1 and a processor 306-1. Execution node 302-2 includes a cache 304-2 and a processor 306-2. Execution node 302-*n* includes a cache 304-*n* and a processor 306-*n*. Each execution node 302-1, 302-2, and 302-*n* is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-*n*. Execution node 312-1 includes a cache 314-1 and a processor 316-1. Execution node 312-2 includes a cache 314-2 and a processor 316-2. Execution node 312-*n* includes a cache 314-*n* and a processor 316-*n*. Additionally, virtual warehouse 3 includes three execution nodes 322-1, 322-2, and 322-*n*. Execution node 322-1 includes a cache 324-1 and a processor 326-1. Execution node 322-2 includes a cache 324-2 and a processor 326-2. Execution node 322-*n* includes a cache 324-*n* and a processor 326-*n*.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
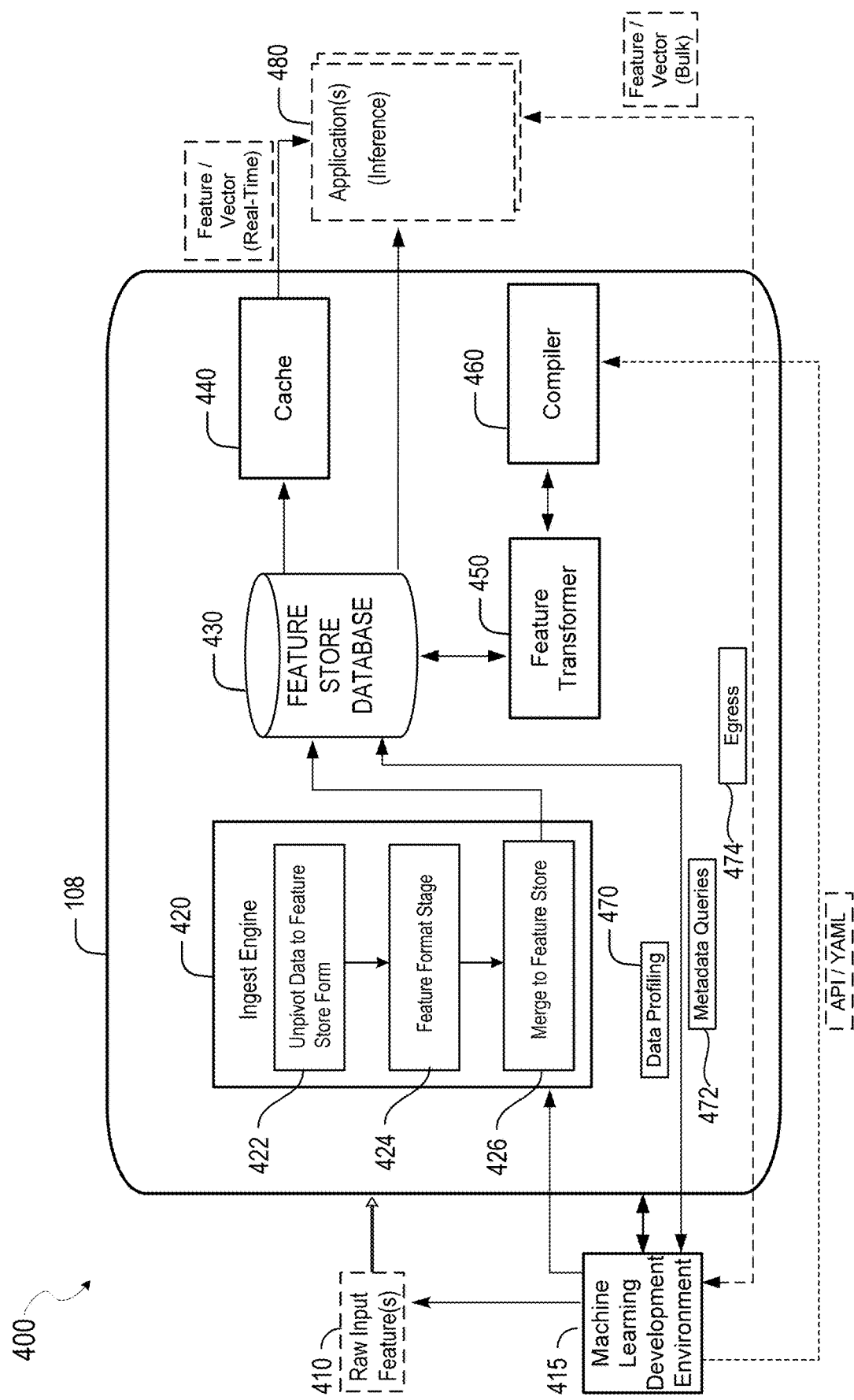
FIG. 4 is a computing environment conceptually illustrating an example software architecture, in accordance with some embodiments of the present disclosure.

FIG. 4 is a computing environment 400 conceptually illustrating an example software architecture, in accordance with some embodiments of the present disclosure.

Embodiments of subject technology model, pivot and store each intersection of a feature/entity (column/row) value as a row in a table, discarding empty (NULL) values from the relational form for storage efficiency. The subject technology also stores the table, column and row level metadata in similar format within the same table. Advantageously, this can eliminate the limitations of working in an original wide form where table and column limits prevent efficient storage and manipulation in a given database. Once stored in the new tall form, commonly required data-profiling and transformations can be applied to the features collectively and efficiently in a single query and pass over the data, reducing the complexity and errors that result when working with wide datasets. In an example, the techniques are enabled based at least on the efficiency of the subject system's storage and processing for working with data in tall semi-structured form, which is described further below in the discussion of FIG. 5 and FIG. 6.

Additionally, in some embodiments, the subject system enables supporting changes and the storage of a Cells value over time, through addition timestamp/version of row. Logical updates to an individual cells value, in a wide row, can be made through the insertion of a new record for the row/column coordinate, without need to modify unchanged values on the row, or touch/change the prior value. This also enables the querying of data AS-OF any prior reference time.

As illustrated, in embodiments, the compute service manager 108 includes an ingest engine 420, feature store database 430, cache 440, feature transformer 450, and compiler 460.

A machine learning development environment 415 can include (not shown) several components that facilitate development of machine learning models. For example, in some implementations, the machine learning development environment 415 includes components that support different users or data scientists, a customer schema, domain specific language packages, a sandbox environment (e.g., data science sandbox), and the like. It is appreciated that more or fewer components may be provided by the machine learning development environment and still be within the scope of the subject technology.

As part of the machine learning development cycle, the aforementioned components of machine learning development environment 415 can facilitate the creation of raw input features 410, corresponding to (raw) datasets for machine learning models and development, which are then received by the ingest engine 420 for processing.

The ingest engine 420 can ingest the raw input features on a periodic basis for processing. The ingest engine 420 can unpivot data to a feature store form at 422. The ingest engine 420 can perform additional operations to convert the data to a final feature store format during a feature store stage 424 such as generating additional metadata corresponding to table or column metadata (described further below) among other types of operations. Further, the ingest engine 420 merges the feature store data at 426 to the feature store database 430.

In some embodiments, as part of the machine learning model development cycle, the feature transformer 450 can perform one or more transformation operations for the data (e.g., to produce one or more derived features) and then store the transformed data back into the feature store database 430. In this manner, a lineage from the original ingestion of the raw input features 410 up to the most recent transformation of data can be stored in the feature store database 430.

As further shown, data profiling 470 can provide functionality related to summarization and statistical profiling for the data in the feature store database 430 (e.g., across tens or hundreds of features at a time based on tags or filters). In an implementation, data profiling 470 can be performed on a periodic basis as new or additional data is received or stored in the feature store database 430.

Data from the feature store database 430 can be sent (e.g., using an egress component 474 or some other communication or data transfer interface) to developers or data scientists from the machine learning development environment 415 for training such data in a given machine learning model. For testing new input data for a trained model, data from feature store database 430 can be sent to one or more applications 480. Such applications can include an embedded (trained) model that performs various predictions and other machine learning operations.

Users (e.g., data scientists) from the machine learning development environment can send API (e.g., application programming interface) or YAML (e.g., "YAML Ain't Markup Language") function/method calls to the compiler 460, which may process such calls to perform the previously discussed transformation operations by the feature transformer 450. Further, metadata queries 472 can be sent to the feature store database 430 as part of the machine learning model development cycle.

As further shown, data from the feature store database 430 can be stored in cache 440, which can then be sent to one or more applications 480. In an example, such data may correspond to substantially "real-time" data for processing by a given machine learning model in the one or more applications 480. A table mapping features to models or applications enables the specific subsets of features required to be cached and maintained, with time-variant versioning if required.

Figure 5:
FIG. 5 illustrates examples of database tables, in accordance with some embodiments of the present disclosure.

FIG. 5 illustrates examples of database tables, in accordance with some embodiments of the present disclosure.

As illustrated, a source table 510 includes data (e.g., raw input features for machine learning model development, and the like). The source table 510 includes multiple columns of data (e.g., column a to column i in this example) in each row of the source table 510. Thus, it is appreciated that the source table 510 represents a very "wide" table (e.g., many columns per row) for storing a given dataset.

The source table 510 can be converted into a format shown in the table 520 corresponding to a feature store data format. In an example, the feature store data format converts the data from the source table 510 into a tall semi-structured form (e.g., less columns or less wide than the table 510). The table 520, in this example, includes a column for a table identifier (ID), a row ID, a column ID, and a value for each corresponding column value from the source table 510.

As further shown, a table metadata table 522 for storing table metadata (e.g., timestamp for when table was created, description information, table IDs, tag strings, and the like), and a column metadata table 524 for storing column metadata (e.g., timestamp for when data was ingested, data types, tag strings, table IDs, column IDs, order or ordinal position, and the like).

The following discussion of FIG. 6 describes other examples of how the data can be stored in the subject system in some embodiments.

FIG. 6 illustrates examples of database tables, in accordance with some embodiments of the present disclosure.

As illustrated, a source table 610 can include different input data for storing in the subject system. The source table 610 includes multiple rows where each row includes multiple columns for different data. In this example the data includes data, in each row, for different vehicles and attributes corresponding to each vehicle.

The subject system can perform an unpivot operation(s) to convert the data from the source table 610 to a table 620. In this example, the table 620 includes the data from the source table 610 in a single column format. Each row in the table 620 includes a row type, a row object ID, and data value(s) (e.g., corresponding to a cell from the source table 610, table metadata, or column metadata).

In this example, the table 620 includes a row for table metadata, several rows for column metadata, and multiple rows for cell data (e.g., corresponding to each cell from a row of the source table 610). However it understood that the table 620 can include more or fewer rows and still be within the scope of the subject technology.

Due to at least in part of this column format for storing the cell data, query operations (or other types of database operations) can be more readily performed on logical groupings of data in the table 620. In some embodiments, logical groupings can be maintained flexibly as an additional metadata type, within the table 620 as required, offering flexibility in application.

Figure 7:
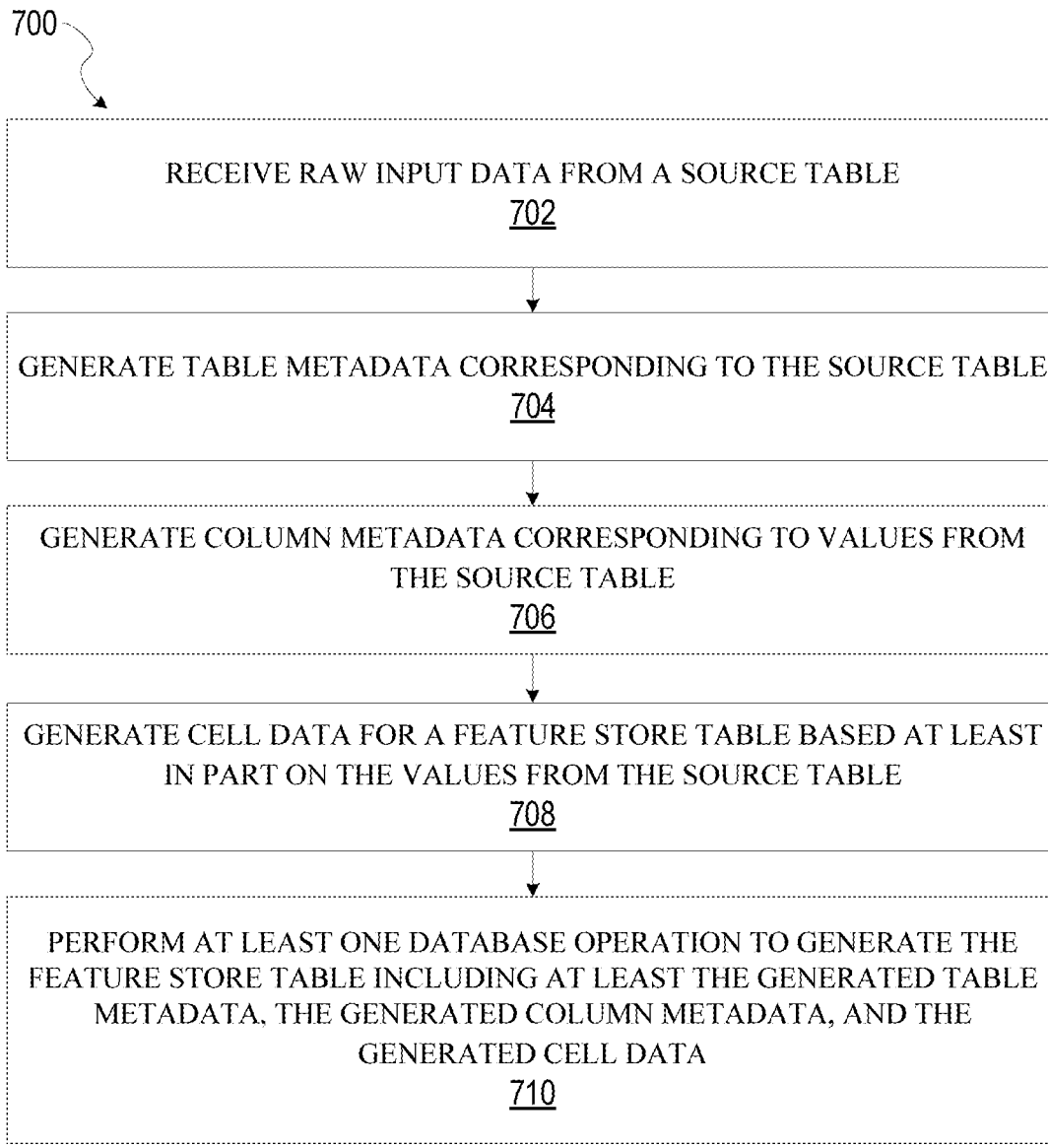
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

At operation 702, the ingest engine 420 receives raw input data from a source table, the raw input data including data including input features for a machine learning model, the raw input data being in a first format including at least multiple rows with each row including multiple columns of values.

At operation 704, based at least in part on the source table, the ingest engine 420 generates table metadata corresponding to the source table. In an embodiment, generating table metadata includes generating a table metadata table, the table metadata table including a set of rows, each row including particular metadata, the particular metadata including at least a timestamp for when the source table was created, description information, table identifier, or a tag string.

At operation 706, based at least in part on the received raw input data, the ingest engine 420 generates column metadata corresponding to values from the source table. In an embodiment, generating column metadata includes generating a column metadata table, the column metadata table including a set of rows, each row including particular metadata, the particular metadata including a timestamp for when data was ingested, data type, tag string, table identifier, column identifier, or ordinal position.

At operation 708, the ingest engine 420 generates cell data for a feature store table based at least in part on the values from the source table. In an embodiment, generating cell data includes generating a cell data table, the cell data table including a set of rows, each row including particular cell data, the cell data including a table identifier, a row identifier, a column ID, and a value for each corresponding column value from the source table. Moreover, the cell data table includes a number of columns less than a number of columns of the source table in an example.

At operation 710, the ingest engine 420 performs at least one database operation to generate the feature store table including at least the generated table metadata, the generated column metadata, and the generated cell data. In an embodiment, the at least one database operation includes an unpivot operation, or a union all insert operation. Alternatively, in an embodiment, both the unpivot operation and the union all insert operation are performed by the ingest engine 420 to generate the feature store table.

In an embodiment, the feature store table includes multiple rows, each row including multiple columns, the multiple columns including a first column including data for a row, a second column including data for a row identifier, and a third column including data from the generated table metadata, the generated column metadata, and the generated cell data.

In an embodiment, the unpivot operation performs a particular operation to convert multiple columns of data from the generated table metadata, the generated column metadata, and the generated cell data into a single row in a single column of data in the feature store table.

In an embodiment, the union all insert operation includes combining data from the generated table metadata, the generated column metadata, and the generated cell data, and inserting the combined data into the feature store table as a one or more rows of data, the one or more rows of data being stored in a single column of the feature store table.

Additionally, in an implementation, the feature store table includes data stored in a feature store format, the feature store format including multiple columns of data from the generated table metadata, the generated column metadata, and the generated cell data stored in a single column in the feature store table.

Figure 8:
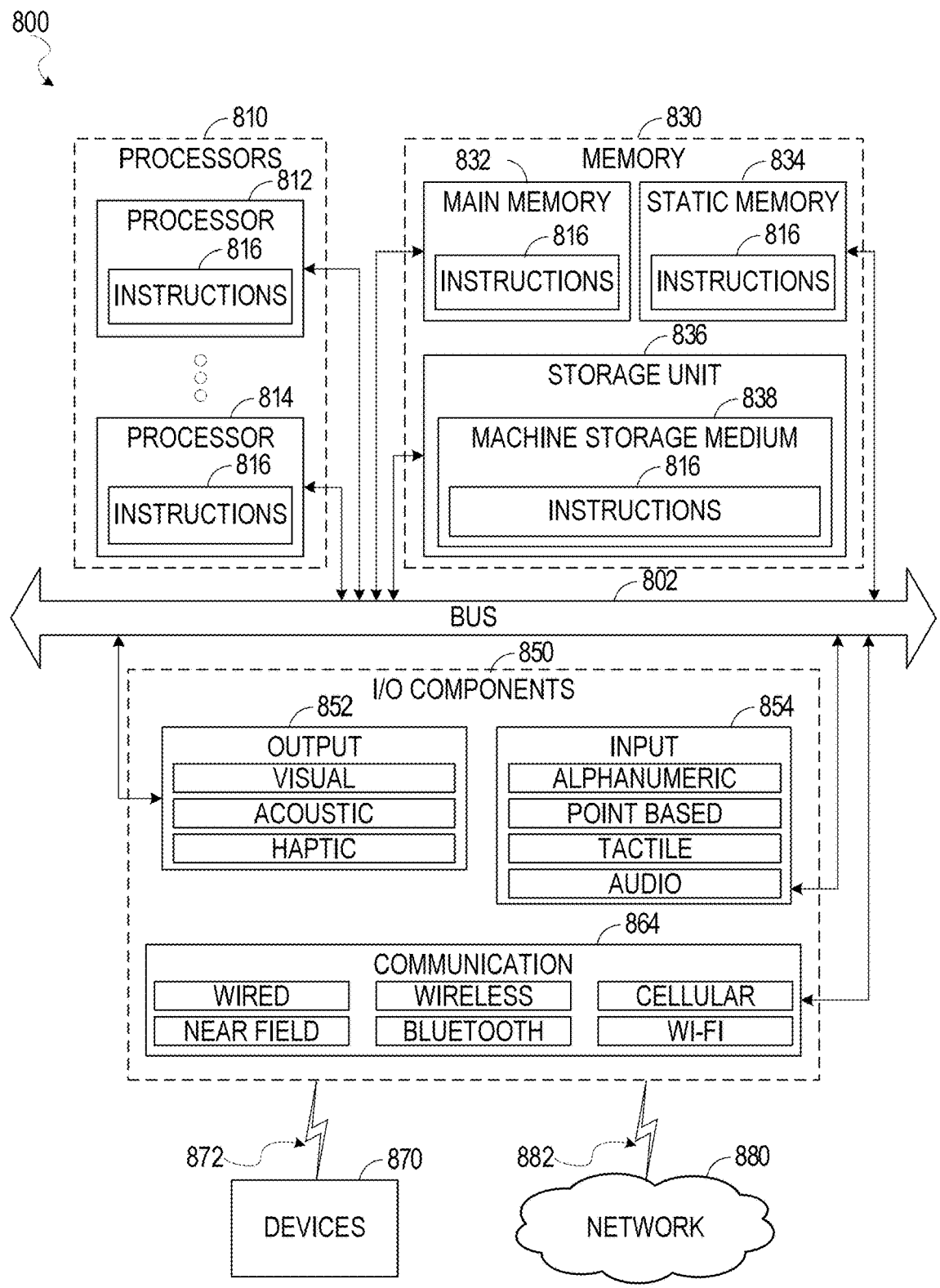
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of method 700. As another example, the instructions 816 may cause the machine 800 to implement portions of the data flows illustrated in at least FIG. 4. In this way, the instructions 816 transform a general, non-programmed machine into a particular machine 800 (e.g., the compute service manager 108 or a node in the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108 or the execution platform 110, and the devices 870 may include the client device 114 or any other computing device described herein as being in communication with the network-based database system 102 or the cloud storage platform 104.

Executable Instructions and Machine Storage Medium

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Conclusion

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    a hardware processor; and
    a memory storing instructions that cause the hardware processor to perform operations comprising:
    generating, by a database system, cell data for a particular table based on values from a source table, the values being based on raw input data, the source table comprising multiple rows and multiple columns, the raw input data comprising values in a first format, the values comprising input features corresponding to datasets included in the raw input data for machine learning models, the source table being provided by an external environment, the external environment comprising an external system from the database system and is accessed by different users; and
    performing a database operation to generate the particular table including table metadata, column metadata, and the generated cell data,
    the generated particular table comprising a second format that causes more efficient processing of data by the database system using a single query on the particular table compared to processing the raw input data from the source table,
    the second format comprising multiple columns of data from the table metadata, the column metadata, and the generated cell data being stored in single column in the particular table, the second format being generated by at least discarding empty values from the raw input data in the first format, the discarding of the empty values providing storage efficiency when storing the generated particular table.

2. The system of claim 1, wherein the external environment comprises a machine learning development environment, the machine learning development environment providing a sandbox environment for the different users to access.

3. The system of claim 1, wherein generating cell data comprises:
    generating a cell data table, the cell data table including a set of rows, each row comprising particular cell data, the cell data comprising a table identifier, a row identifier, a column ID, and a value for each corresponding column value from the source table, wherein the cell data table includes a number of columns less than a number of columns of the source table.

4. The system of claim 1, wherein the operations further comprise:
    based on the source table, generating table metadata corresponding to the source table; and
    based on the raw input data, generating column metadata corresponding to values from the source table.

5. The system of claim 4, wherein generating table metadata comprises:
    generating a table metadata table, the table metadata table including a set of rows, each row comprising particular metadata, the particular metadata comprising a timestamp for when the source table was created, description information, table identifier, or a tag string.

6. The system of claim 4, wherein generating column metadata comprises:
    generating a column metadata table, the column metadata table including a set of rows, each row comprising particular metadata, the particular metadata comprising a timestamp for when data was ingested, data type, tag string, table identifier, column identifier, or ordinal position.

7. The system of claim 1, wherein the database operation comprises an unpivot operation, or a union all insert operation.

8. The system of claim 7, wherein the unpivot operation performs a particular operation to convert multiple columns of data from the generated table metadata, the generated column metadata, and the generated cell data into a single row in a single column of data in the particular table.

9. The system of claim 7, wherein the union all insert operation comprises:
combining data from the table metadata, the column metadata, and the generated cell data; and
inserting the combined data into the particular table as a one or more rows of data, the one or more rows of data being stored in a single column of the particular table.

10. The system of claim 1, wherein the particular table comprises multiple rows, each row comprising multiple columns, the multiple columns including a first column including data for a row, a second column including data for a row identifier, and a third column including data from the generated table metadata, the generated column metadata, and the generated cell data.

11. A method comprising:
generating, by a database system, cell data for a particular table based on values from a source table, the values being based on raw input data, the source table comprising multiple rows and multiple columns, the raw input data comprising values in a first format, the values comprising input features corresponding to datasets included in the raw input data for machine learning models, the source table being provided by an external environment, the external environment comprising an external system from the database system and is accessed by different users; and
performing a database operation to generate the particular table including table metadata, column metadata, and the generated cell data,
the generated particular table comprising a second format that causes more efficient processing of data by the database system using a single query on the particular table compared to processing the raw input data from the source table,
the second format comprising multiple columns of data from the table metadata, the column metadata, and the generated cell data being stored in single column in the particular table, the second format being generated by at least discarding empty values from the raw input data in the first format, the discarding of the empty values providing storage efficiency when storing the generated particular table.

12. The method of claim 11, wherein the external environment comprises a machine learning development environment, the machine learning development environment providing a sandbox environment for the different users to access.

13. The method of claim 11, wherein generating cell data comprises:
generating a cell data table, the cell data table including a set of rows, each row comprising particular cell data, the cell data comprising a table identifier, a row identifier, a column ID, and a value for each corresponding column value from the source table, wherein the cell data table includes a number of columns less than a number of columns of the source table.

14. The method of claim 11, further comprising:
based on the source table, generating table metadata corresponding to the source table; and
based on the raw input data, generating column metadata corresponding to values from the source table.

15. The method of claim 14, wherein generating table metadata comprises:
generating a table metadata table, the table metadata table including a set of rows, each row comprising particular metadata, the particular metadata comprising a timestamp for when the source table was created, description information, table identifier, or a tag string.

16. The method of claim 14, wherein generating column metadata comprises:
generating a column metadata table, the column metadata table including a set of rows, each row comprising particular metadata, the particular metadata comprising a timestamp for when data was ingested, data type, tag string, table identifier, column identifier, or ordinal position.

17. The method of claim 11, wherein the database operation comprises an unpivot operation, or a union all insert operation.

18. The method of claim 17, wherein the unpivot operation performs a particular operation to convert multiple columns of data from the generated table metadata, the generated column metadata, and the generated cell data into a single row in a single column of data in the particular table.

19. The method of claim 17, wherein the union all insert operation comprises:
combining data from the table metadata, the column metadata, and the generated cell data; and
inserting the combined data into the particular table as a one or more rows of data, the one or more rows of data being stored in a single column of the particular table.

20. A computer-storage medium comprising instructions that, when executed by one or more processors of a machine, configure the machine to perform operations comprising:
generating, by a database system, cell data for a particular table based on values from a source table, the values being based on raw input data, the source table comprising multiple rows and multiple columns, the raw input data comprising values in a first format, the values comprising input features corresponding to datasets included in the raw input data for machine learning models, the source table being provided by an external environment, the external environment comprising an external system from the database system and is accessed by different users; and
performing a database operation to generate the particular table including table metadata, column metadata, and the generated cell data,
the generated particular table comprising a second format that causes more efficient processing of data by the database system using a single query on the particular table compared to processing the raw input data from the source table,
the second format comprising multiple columns of data from the table metadata, the column metadata, and the generated cell data being stored in single column in the particular table, the second format being generated by at least discarding empty values from the raw input data in the first format, the discarding of the empty values providing storage efficiency when storing the generated particular table.

* * * * *